INVENTORS
DAVID RALPH BENNION
WILLIAM KIRK ENGLISH
BY Samuel Lindenberg
Abraham Wasserman
ATTORNEYS INVENTORS
DAVID RALPH BENNION
WILLIAM KIRK ENGLISH
BY Samuel Lindenberg
Abraham Wasserman
ATTORNEYS

MAGNETIC CORE SHIFT REGISTER

INVENTORS
DAVID RALPH BENNION
WILLIAM KIRK ENGLISH
BY Samuel Lindenberg
Abraham Wasserman
ATTORNEYS INVENTORS
DAVID RALPH BENNION
WILLIAM KIRK ENGLISH
BY Samuel Lindenberg
Abraham Wasserman
ATTORNEYS United States Patent Office 3,435,433
Patented Mar. 25, 1969

3,435,433
MAGNETIC CORE SHIFT REGISTER

David Ralph Bennion and William Kirk English, Menlo Park, Calif., assignors to AMP Incorporated, Harrisburg, Pa., a corporation of New Jersey Filed Feb. 9, 1965, Ser. No. 431,341
Int. Cl. G11b 5/74
U.S. Cl. 340—174 12 Claims

ABSTRACT OF THE DISCLOSURE

A magnetic core shift register, comprising a plurality of multiaperture magnetic cores, is provided, in which currents of lower amplitudes than those required in prior art arrangements are employed to transfer desired information between succeeding cores. Each core includes two, substantially equally shaped, peripheral major apertures, between which is interposed at least one rectangularly shaped central aperture, with the center of all the apertures being aligned on a straight line. The dimension of the central aperture along said line is not greater than the dimension of either of the peripheral major apertures along the same line.

Figure 1:
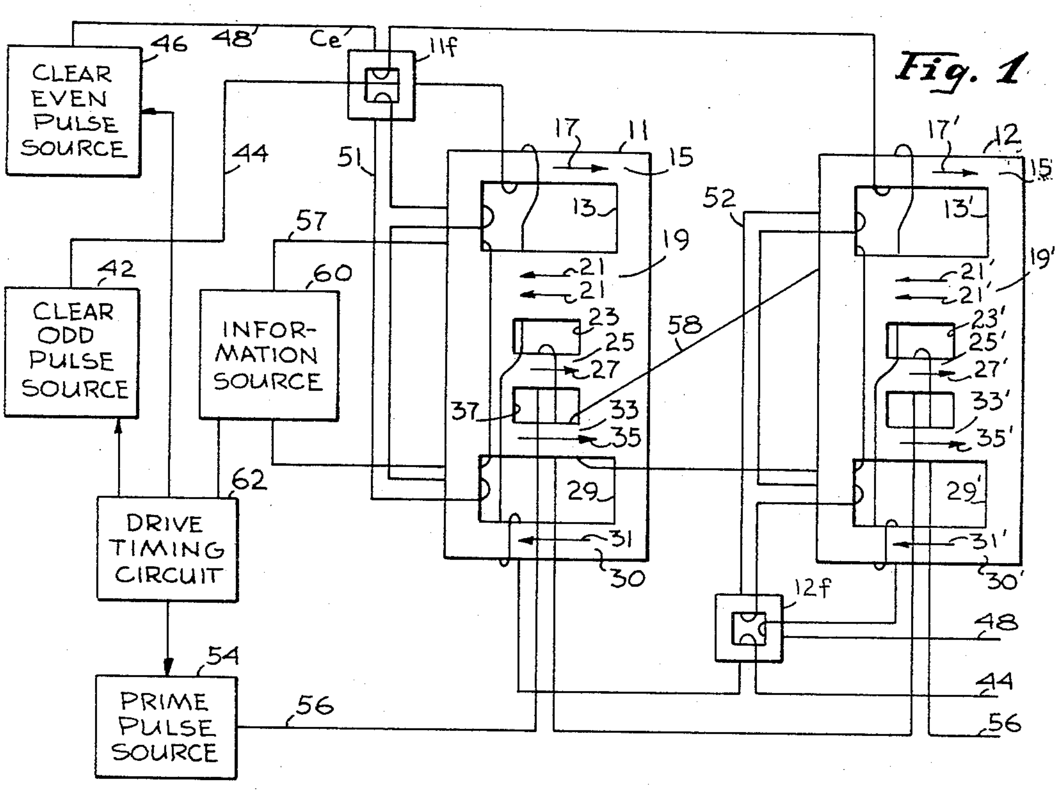

This invention relates generally to magnetic core devices and, more particularly, to an improved multiaperture magnetic core structure finding significant utility in logic circuits of the information transfer type.

Generally, magnetic core information transferring circuits, such as shift registers, include a plurality of stages, with each stage storing a bit of information in a plurality of stages. Each stage generally includes a plurality of magnetic cores. In order to reduce the cost of such a shift register, attempts have been made to interconnect the magnetic cores so that all the functions of each stage of the shift registers are performed by a minimum number of multiaperture magnetic cores.

In the prior art, even when such attempts have been successful, the nature of the transfer scheme dictates that in order for information to be transferred from one core to another, the magnetic flux conditions in each receiving multiaperture core must be changed primarily by current in the input winding. Consequently, the current in the loop coupling the multiaperture core to the preceding core from which the information is supplied, is quite high. As a result, high transfer losses occur in the loops coupling the various cores. Such transfer losses may be controlled by reducing the resistance of the intercoupling loops. However, lower loop resistance in turn limits the speed at which information may be transferred from one core to the next.

Accordingly, it is an object of the present invention to provide a transfer scheme and associated multiaperture magnetic core which requires a minimum amount of excitation from a preceding core in order to store information transferred from the preceding core.

Another object of the invention is the provision of a multiaperture magnetic core structure which can be intercoupled with other structures to comprise a magnetic core shift register in which currents, lower than hitherto possible, can be used in the information loops intercoupling the various cores of the shift register.

A further object of the present invention is to provide a magnetic core shift register in which the resistance in the loops coupling adjacent multiaperture magnetic cores can be considerably greater than in prior art registers, thereby increasing the speed of information transfer, without an increase in transfer losses.

Still another object of the present invention is to provide a new shift register in which currents, lower than hitherto possible, are used to steer the magnetic changes in a receiving core for proper transfer of information.

Still a further object of the present invention is the provision of a multiaperture magnetic core structure useful in information transferring circuits which, due to the novel core structure and manner of operation, can be made quite small, thereby requiring less driving power than comparable prior art circuits.

These and other objects of the invention are achieved by providing a multiaperture magnetic core having two major peripheral apertures, between which are interposed two smaller central aperatures, which define a plurality of core branches or legs.

The core is of the type which can have in each of its legs one of two states of magnetic remanence, one of which is called a "set" state and the other a "clear" state. When incorporated as a stage in a shift register, each multiaperture core is associated with one single aperture core which acts as a source of flux rather than having information storage capabilities.

Coupling loops join adjacent multiaperture cores, arranged in a numbered sequence, with an output leg of each core being coupled to the central part of the succeeding multiaperture magnetic core through the major apertures thereof. In addition, the cores are coupled by means of driving windings, so that the entire shift register may be driven by a four pulse sequence referred to as clear odd, prime, clear even, prime, etc.

The clear odd pulse clears the legs in all the odd multiamperture cores to the clear state, as well as affects the state of magnetic remanence of the peripheries of the even multiaperture cores, by reason of the presence of their respective single aperture cores. In addition, the clear odd pulse also clears the output leg of each odd multiaperture core and transfers the informtion therefrom, via a coupling or information loop, to an input leg in the central section of the next succeeding even multiaperture core. Since the peripheries of each even multiaperture core are affected by its respective single aperture core, the current in the loop, coupling each odd multiaperture core to the next even multiaperture core, need only affect the state of magnetic remanence of the central portion of the even core in order to transfer information to an input leg thereof. Consequently, lower currents than herebefore possible are sufficient to transfer the desired information from the preceding odd multiaperture core.

The lower current results in lower transfer losses in the coupling loops. Also, due to the lower current requirements, higher loop resistance can be tolerated which in turn enables the use of longer loops for the same size multiaperture cores. The ability to tolerate high loop resistance permits the use, for a given size loop, of smaller multiaperture cores, thus reducing the amount of power needed to drive them.

After the clear odd pulse, a prime drive pulse is supplied to the input and output legs of each multiamperture core so that the input leg of any of the even multiaperture cores, which may have been set during the clear odd pulse, is cleared and the output leg of the particular even multiaperture core is set. Then, during the clear even pulse, all even multiaperture cores are cleared. The peripheral legs of all odd multiaperture cores are affected by their respective single aperture cores. The central parts of any of the odd multiaperture cores may be set by the current in the loop coupling it with the preceding even multiaperture core which is being cleared.

Figure 2:
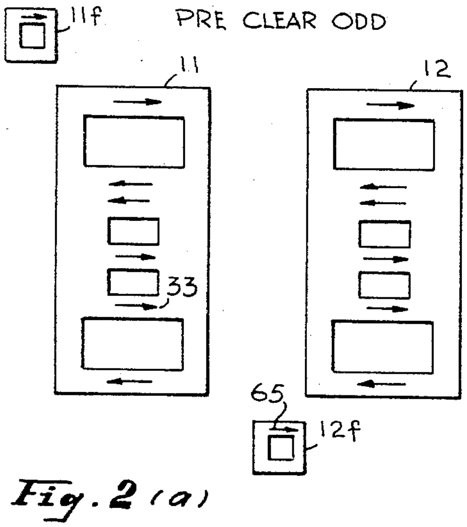
Figure 2:
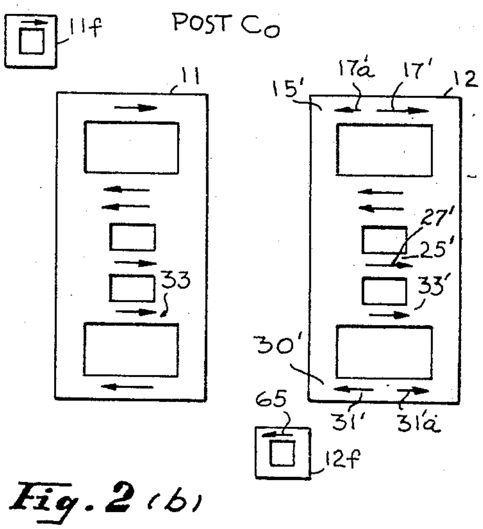
Figure 2C:
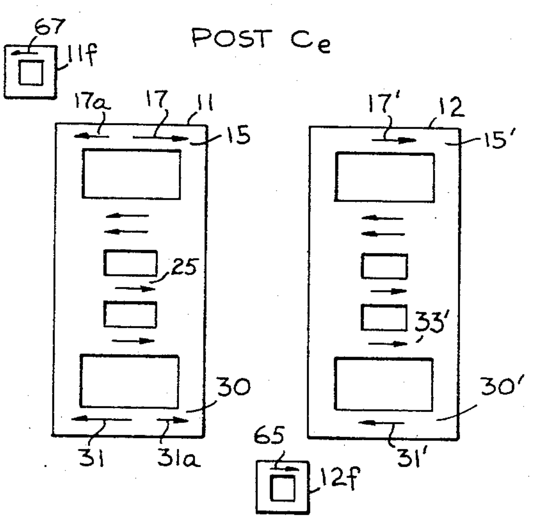
Figure 3A:
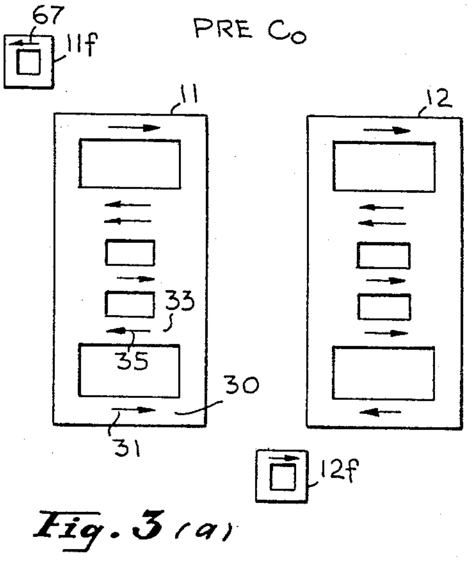
Figure 3B:
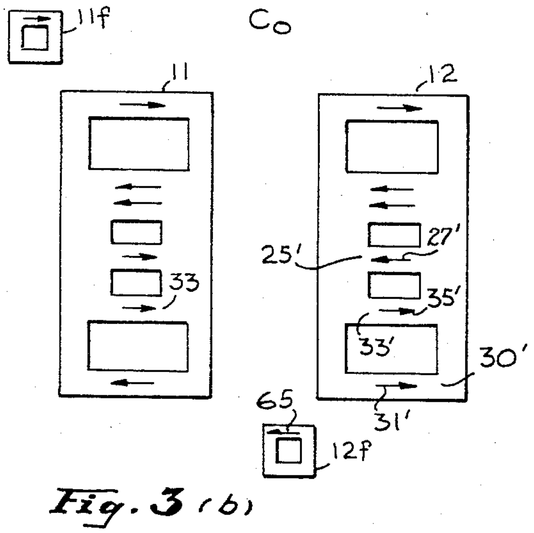
Figure 3C:
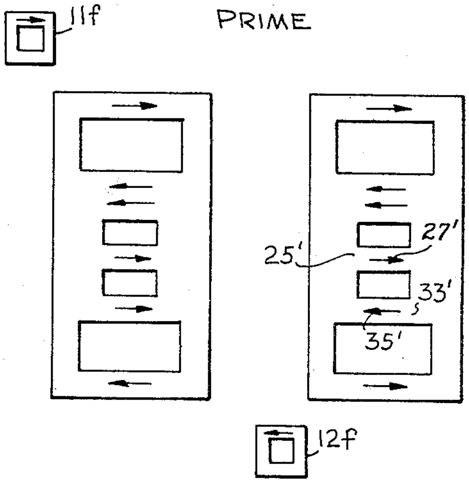
Figure 4:
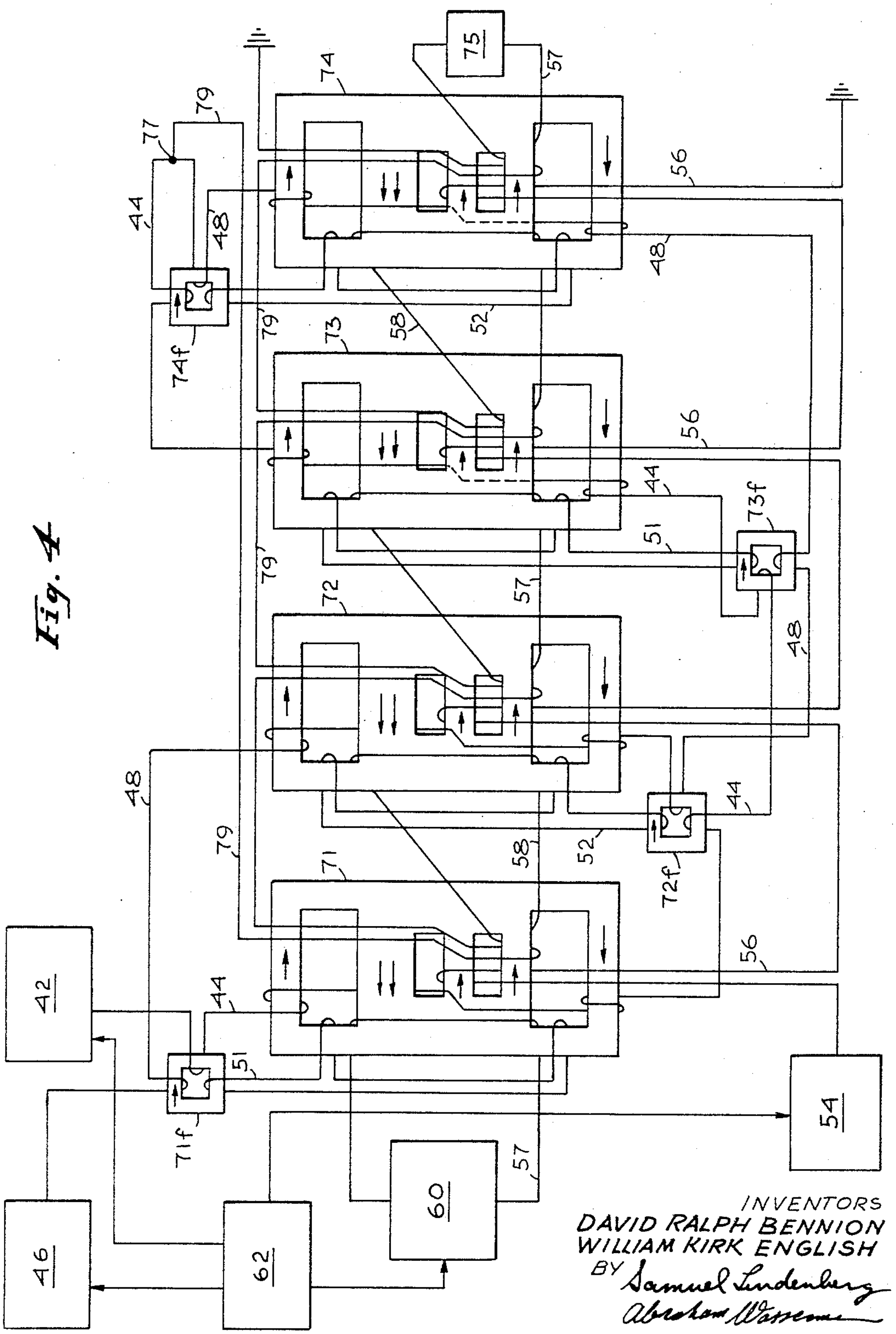
Figure 5:
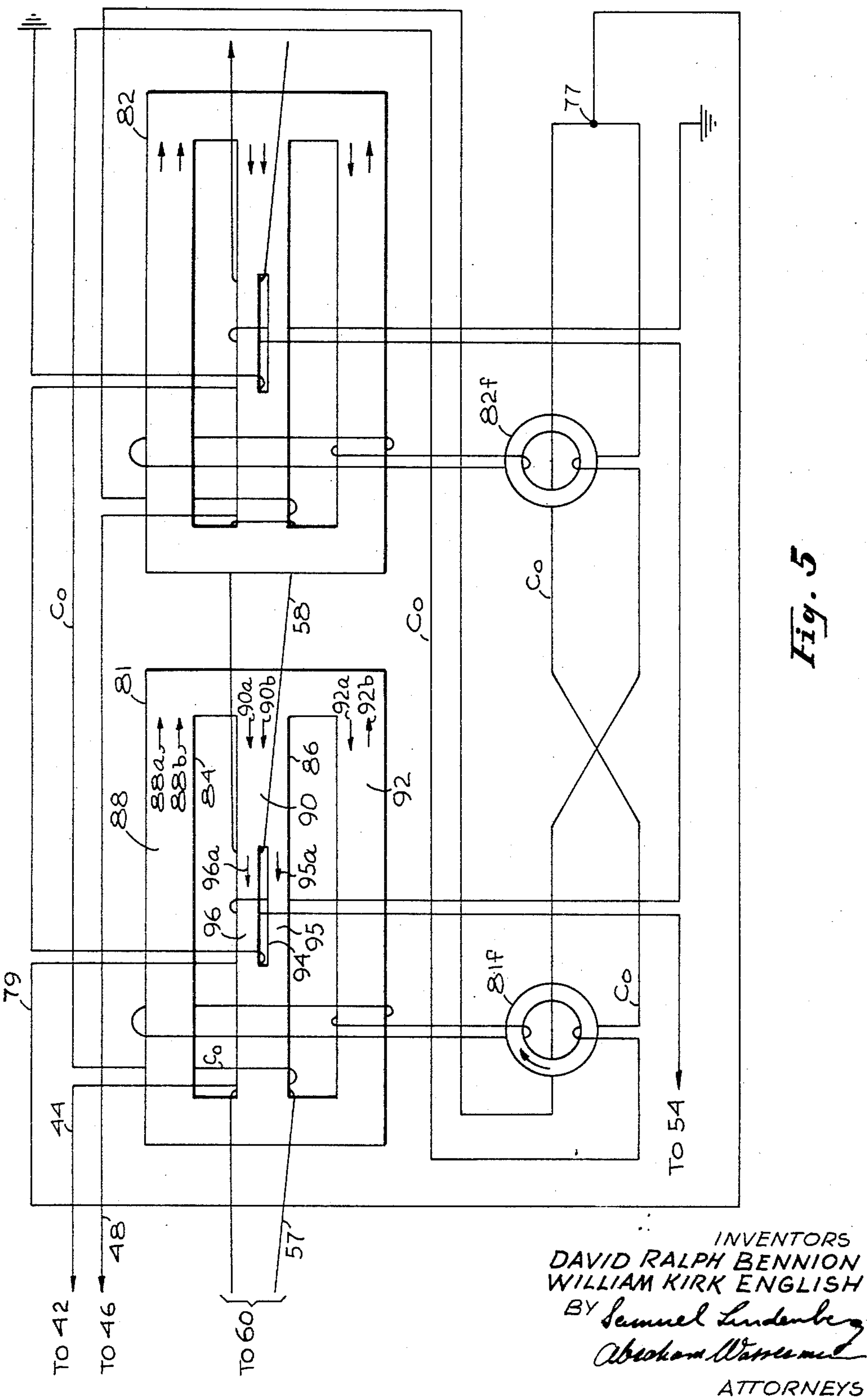

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a schematic diagram of a two stage shift register of the present invention, employing a new multiaperture core;

FIGURES 2(*a*) through 2(*c*) are flux line diagrams useful in explaining the principles of operation of the present invention for the transfer of a binary "0";

FIGURES 3(*a*) through 3(*c*) are flux line diagrams useful in explaining the principles of operation of the present invention for the transfer of a binary "1";

FIGURE 4 is a schematic diagram of a four stage shift register of the present invention; and FIGURE 5 is a schematic diagram of a two stage shift register employing a different new multiaperture core.

Reference is now made to FIGURE 1 of the drawings which illustrates two multiaperture cores constructed and interconnected in accordance with the teachings of the present invention. As seen, a multiaperture core 11, hereinafter also referred to as the odd core, which has a plurality of apertures, is preferably formed of homogeneous ferromagnetic material having two states of magnetic remanence so that the lines of magnetic flux in the closed paths surrounding any of the apertures may have either of two polarities.

An aperture 13 at one end of the odd core 11 is surrounded by a closed magnetic flux path, including a peripheral leg 15 having a unit cross-sectional area, substantially equal to one-half that of a control leg 19, as indicated by two arrows 21. The control leg 19 is a part of a magnetic flux path surrounding an input aperture 23 which also includes a central input leg 25 of unit cross-sectional area as indicated by an arrow 27.

Another aperture 29 equal in size to aperture 13 positioned near the other end of the multiamperture core 11, is surrounded by a closed magnetic flux path, which includes a peripheral leg 30 having a unit cross-sectional area, as indicated by arrow 31. The closed path around aperture 29 also includes an output leg 33 of unit cross-sectional area, as indicated by an arrow 35. Output leg 33, together with input leg 27, form a part of a closed magnetic flux around an output aperture 37, which is between the peripheral aperture 29 and input aperture 23.

The construction of the other multiaperture core shown in FIGURE 1, designated by numeral 12 and hereinafter also referred to as the even core, is identical to that of odd core 11. Therefore, the various apertures and legs of core 12 are designated by numerals similar to those used in describing core 11 with the addition of being primed (i.e., 13', 15', etc.). In FIGURE 1, multiaperture cores 11 and 12 and the various apertures are shown, by way of example and not as a limitation, as having rectangular shapes. Cores and apertures of other shapes may be utilized as long as the relative total flux paths are maintained.

For explanatory purposes, let it be assumed that the arrows shown in cores 11 and 12 in addition to representing the units of cross-sectional area of the various legs, also indicate the direction of flux lines through the legs. Since the flux lines may be directed in either of two opposite polarities, let it further be assumed that the polarities indicated in FIGURE 1 represent a clear state, whereas an arrow in any of the legs pointing in the opposite direction from that shown will represent the leg to be in a set state.

According to the teachings of the present invention, information such as a binary "1" or a binary "0" are transferable from one multiaperture core to a succeeding multiaperture core by means of a four pulse drive sequence which hereinafter will be referred to as clear odd pulse, prime pulse, clear even pulse, prime pulse, etc. The clear odd pulse returns the flux in all the legs of all the odd multiaperture cores such as multiaperture core 11 to their clear state (as shown in FIGURE 1), and at the same time transfers any information stored in the form of flux polarity in output leg 33 of each odd multiaperture core to the input leg 25' of the succeeding even multiaperture core.

During the following prime pulse, the information is transferred from the input leg 27' of each even multiaperture core to the output leg 33' thereof. Then, the clear even pulse clears the even multiaperture cores and transfers information to the succeeding odd multiaperture cores. The fourth pulse in the sequence, namely the second prime pulse, transfers the information from the input leg 27 of each odd multiaperture core to the output leg 33 thereof.

As seen in FIGURE 1, each of the multiaperture cores 11 and 12 is associated with a single aperture core, hereinafter referred to as a flux source core. Thus, multiaperture core 11 is associated with a core **11*f* and multiaperture core 12 is coupled to core 12*f*. The operation of the flux source cores is most significant in that each of them provides to its associated multiaperture core, via an intercoupling winding, magnetomotive forces that will set a sum total of flux in a pair of legs such as 15' and 30', equal to the flux capacity of the source core, regardless of the information transferred to such a multiaperture core from the preceding core. Thus, the loops intercoupling the various multiaperture cores through which information is transferred need only supply limited currents to affect only the input legs of the multiaperture cores, and in turn, the distribution of the source core flux between legs 15' and 30'**.

For a better understanding of the present invention, reference is again made to FIGURE 1 wherein a clear odd pulse source 42 is shown coupled to multiaperture core 11 and cores **11*f* and 12*f*, by means of a clear odd drive winding 44 which successively passes through core 11*f*, around leg 15, through input aperture 23, around leg 30 and through core 12*f*. Therefrom, the winding 44 continues to a single aperture core such as 11*f* associated with the odd multiaperture core which succeeds multiaperture core 12. Similarly, a clear even pulse source 46 is coupled to cores 11*f*, 12 and 12*f* by means of a clear even drive winding 48 which successively passes through core 11*f*, around leg 15', through input aperture 23', around leg 30' and through core 12*f*. Therefrom, the winding 48 continues to a single aperture core such as 12*f*, associated with the next even multiaperture core in the series of multiaperture cores, of which multiaperture cores 11 and 12 are but the first odd and even multiaperture cores respectively. Flux winding 51 couples core 11*f* to peripheral legs 15 and 30, while flux winding 52 couples core 12*f* to peripheral legs 15' and 30'**.

A prime pulse source 54 is coupled to the input and output legs of each multiaperture core by means of a prime drive winding 56 which is wound about the two legs of each core in opposite winding polarities. In addition, the output leg 33 of odd core 11 is coupled to the central section of even core 12 by an information loop 58 wound through apertures 37, 29 of multiaperture core 11 and apertures 13' and 29' of multiaperture core 12. Assuming that odd core 11 is a first in a series of multiaperture cores, information is supplied thereto from an information source 60 via an information loop 57, so that information from the source may be stored in leg 25 at the appropriate time in the drive sequence. If however, multiaperture core 11 were not the first core in the series, the information loop 57 would couple the central portion of the multiaperture core 11 to the output leg of the preceding even multiaperture core. The pulse sources 42, 46 and 54 as well as information source 60, are synchronized by means of a timing circuit 62 so that the various driving pulses are supplied in the desired drive sequence.

The particular method of operating the circuit constructed in accordance with the present invention may now best be explained in conjunction with specific examples of the manner in which a binary zero and binary one are transferable from one multiaperture core to the other. Let it be assumed that prior to a clear odd pulse from the source 42, supplied via winding 44, the direction of flux lines in the various legs of multiaperture cores 11 and 12 and cores 11*f* and 12*f* is as shown in FIGURE 2(*a*) to which reference is made herein. Namely, all the legs of the cores are in a clear state. Since output leg 33 of multiaperture core 11 is clear, it represents a binary "0." Then a clear odd pulse from source 42 is supplied, via drive winding 44. As a result, cores 11 and 11*f* will be cleared. However, since they were clear prior to the clear odd pulse, the flux therein will not change as seen from FIGURE 2(*b*), which represents the flux conditions in the cores after the clear odd pulse. The clear odd pulse sets the flux source core 12*f* as indicated by the left pointing arrow 65 in FIGURE 2(*b*). The setting of core 12*f* induces a current in flux winding 52 (FIGURE 1) so that the flux in the periphery legs 15′ and 30′ reverse only halfway as indicated by the short left pointing arrow 17′*a* and the short right pointing arrow 31′*a* [FIGURE 2(*b*)]. The reason legs 15′ and 30′ each reverse just halfway is because the flux capacity of core 12*f* is made equal to that of leg 15′ or 30′ alone, i.e., one unit.

During the clear odd pulse, output leg 33 of odd core 11 is cleared. But, since prior to the pulse the output leg was in the clear state, current is not induced in information loop 58 which couples cores 11 and 12. As a result, core 12 is affected only by the excitation in winding 52 which alone cannot set flux in the input leg 25′ of multiaperture core 12. Consequently, leg 25′ remains in the clear state as indicated by arrow 27′ which points to the right. Namely, a binary "0" is transferred to input leg 27′ from the output leg 33 of the preceding odd multiaperture core by the absence of current in the information loop 58.

The next pulse in the driving sequence is a prime pulse from source 54. Its function is to transfer in each core the information from the input leg to the output leg. In the present example, since a zero is stored in the input leg 25′, i.e., leg 25′ is clear, leg 33′ will also remain in the clear state in which it was prior to the prime pulse. Thus, in this case, the information, namely, the "0," is transferred from input leg 25′ to output leg 33′ by default.

The next pulse is the clear even pulse, supplied via drive winding 48 from source 46. The following changes occur in response thereto as indicated in the flux diagram of FIGURE 2(*c*). Peripheral legs 15′ and 30′ are returned to their clear state, as indicated by arrows 17′ and 31′, and the absence of the short reversing arrows 17*a*′ and 31*a*′, and core 12*f* is cleared, balancing flux changes in the winding 52. Also, the center portion of even core 12 is cleared, so that had output leg 33′ been in the set state, namely, had a "1" been stored therein, it would have induced a current in the information loop coupling it with the next succeeding odd multiaperture core. However, since in the present example output leg 33′ is already clear, the clear even pulse will cause a zero to be transferred to the next odd multiaperture core, by the absence of an induced current. Thus, the binary "0" previously stored in leg 33 of odd multiaperture core 11, which was transferred to even multiaperture core 12 by the clear odd pulse, is now transferred to the next succeeding odd multiaperture core by the clear even pulse. Indeed, the transfer of information is accomplished by the absence of current in the information loops, such as loop 58.

In addition to the following operations, the clear even pulse also sets the flux source core 11*f* as indicated by a left pointing arrow 67 [FIGURE 2(*c*)]. As a result, a current is induced in winding 51 (FIGURE 1) which reverses some of the flux in peripheral legs 15 and 30 as indicated by short arrow 17*a* and 31*a* [FIGURE 2(*d*)]. However, whether any flux switching would occur in the central portion of odd core 11, and in particular input leg 25, would depend on whether current in information loop 57, which represents a binary "1," is supplied thereto.

The manner in which a binary "1" is transferred from one multiaperture core to the other may best be explained in conjunction with the following example, considered in conjunction with FIGURES 1 and 3(*a*) through 3(*c*). Let us assume that prior to a clear odd pulse, the flux states in the legs of the various cores are as shown in FIGURE 3(*a*). Cores 12 and 12*f* are in their clear states. Core 11*f* is set as indicated by the left pointing arrow 67. Also leg 30 of multiaperture core 11 is set as indicated by the right pointing arrow 31, and output leg 33 is set as indicated by arrow 35 pointing to the left. Thus, odd core 11 is assumed to store a binary "1."

Thereafter, the clear odd pulse clears cores 11*f* and 11 as well as sets core 12*f*. As a result of the setting of core 12*f*, incomplete flux reversal occurs in peripheral legs 15′ and 30′. But, at substantially the same time, the clearing of odd core 11, and in particular output leg 33, induces a current in information loop 58, coupling multiaperture cores 11 and 12. The combination of the flux reversal in even core 12, due to the current in loop 58 and that induced by flux winding 52 is sufficient to reverse substantially all of the flux in peripheral leg 30′ and thus set it as well as input leg 25′, with the flux in leg 15′ remaining substantially unchanged. The total flux set in legs 25′ and 30′ is equal to the one unit supplied by the flux source core 12*f*. The setting of leg 25′ is indicated by left pointing arrow 27′, while the setting of leg 30′ is indicated by right pointing arrow 31′. It is thus seen that a "1" is transferred to even multiaperture core 12 since input leg 25′ thereof is set. The effect of the clear odd pulse is diagrammed in FIGURE 3(*b*).

As seen from FIGURE 3(*c*), which represents the state of magnetic flux after the next prime pulse, during the next prime pulse, all flux directions remain the same except the binary "1" stored in input leg 25′ is switched therefrom to the output leg 33′, as indicated by arrows 27′ and 35′ pointing in opposite directions, from those diagrammed in FIGURE 3(*b*). Thus, after the prime pulse, the binary "1" is stored in the output leg 33′ so that during the next clear even pulse, the "1" stored therein may be transferred to the next succeeding odd multiaperture core. The transfer is done in the form of current induced in an information loop (such as loop 58) coupling even core 12 to the next succeeding multiaperture core, as a result of output leg 33′ returning to its clear state.

From the foregoing description, and in particular, the examples used to explain the manner in which information is transferred from one multiaperture core to the other, it is seen that the switching of a substantial amount of the flux necessary to overcome major-aperture thresholds is induced by means of a flux source core. For example, during a clear odd pulse when information is transferred from odd core 11 to even core 12, it is flux source core 12*f* which induces a current in flux loop 52 so that a partial flux reversal occurs in legs 15′ and 30′. This flux reversal occurs irrespective of the information transferred to even core 12 which is a function of the current in information loop 58. Thus, the current in the loop 58 need be sufficient only to "steer" or reverse the flux through the center section of the even core and not through the larger threshold of the path around the outside periphery.

When a binary "0" is transferred to even core 12, namely when no current is induced in loop 58, the center section and in particular input leg 25′ is not set so that any flux reversal in multiaperture core 12 is due to that supplied by flux source core 12*f* [see FIGURE 2(*b*)]. However, when a binary "1" is received by even core 12, via a current in loop 58, such current need only reverse the flux in the center section of core 12 so that, together with the flux reversed by flux source core 12*f*, peripheral leg 30′, and in particular, input leg 25′ are set [see FIGURE 3(*b*)].

It is thus apparent that the current in the information loop coupling any two multiaperture cores need only overcome the threshold of flux reversal in the center section of each receiving core. The larger threshold of the flux path around the periphery of the multiaperture core is overcome by current induced by the flux source core associated with the receiving multiaperture core. Consequently, the current in the information loop is considerably lower than that required in prior art systems in which information is transferred from one multiaperture core to the other. The lower currents result in lower transfer losses and permit longer information loops with higher resistance values.

It will be appreciated by those familiar with the art that during the prime pulses, during which the information stored in the input leg of each multiaperture core is transferred to the output leg of the core, an electromotive force (EMF) is induced in the information loops such as loop 58. This EMF is balanced by the IR drop in the loop so that no information is transferred between cores by the prime pulse. With information loops of low resistance, longer priming operation is required. However, the present invention, by enabling the use of information loops with larger resistance values, reduces the time required for the priming operations, and thereby provides a system which can be operated faster than herebefore possible.

In addition to increasing the speed of operation, the ability to use information loops with high resistance values enables the use of longer information loops for a given multiaperture core size. Thus, greater miniaturization is possible. Namely, for a given loop length, smaller multiaperture cores can be used, thereby reducing the power required to drive the circuit. Thus, a circuit comprising a plurality of multiaperture cores constructed and coupled according to the teachings hereinbefore described, can be operated with less power than heretofore possible.

Reference is now made to FIGURE 4 which is a schematic diagram of a four stage shift register constructed in accordance with the present invention. Cores 71 and 73 are the odd multiaperture cores, whereas cores 72 and 74 are the even cores. Flux source cores **71*f* through 74*f* are associated with multiaperture cores 71–74 respectively. The cores are intercoupled in a manner similar to that shown in FIGURE 1, with like elements designated by like numerals. Information is supplied to the first multiaperture core 71 from the information source 60. Similarly, the output leg of the last multiaperture core 74 is coupled via an information loop 57 to an information sink 75** to which the information is finally transferred.

As seen from FIGURE 4, the clear odd drive winding 44 and clear even drive winding 48, after being wound through their respective cores and around the various core legs as hereinbefore explained, are interconnected at a junction point 77. A hold winding 79 is coupled between the junction point 77 and a reference potential such as ground. The hold winding 79 is successively wound about the output legs of the multiaperture cores to prevent any spurious effects on the direction of flux lines in the output legs, due to currents induced in the various windings coupled thereabout. Such holding techniques are well known in the art.

The novel teachings of the present invention whereby the flux thresholds of the path around the outside periphery of a multiaperture core are overcome by currents induced by a flux source core, so that the current in a loop supplying the information to the multiaperture core need only overcome the threshold of the center portion of the multiaperture core, need not be limited to the particular multiaperture core structure hereinbefore described. Other multiaperture core structures may similarly be adapted to such a method of operation, wherein the current in the information loops is greatly reduced over prior art systems.

Reference is now made to FIGURE 5 which is a schematic diagram of two multiaperture cores 81 and 82 intercoupled with their respective flux source cores **81*f* and 82*f*. Each of the multiaperture cores 81 and 82 is shown by way of example as being rectangular in shape and having two major apertures 84 and 86 forming two peripheral legs 88 and 92. Peripheral leg 88, which is assumed to have a cross-sectional area of two units as indicated by arrows 88*a* and 88*b*, is between the periphery of the multiaperture core and the aperture 84. Similarly, peripheral leg 92, which is also assumed to have a cross-sectional area of two units as indicated by arrows 92*a* and 92*b*, is between the periphery of the multiaperture core and aperture 86. The core material between apertures 84 and 86 forms a center leg 90 of two units cross-sectional area as indicated by arrows 90*a* and 90*b*. At about the center of leg 90, an aperture 94 is interposed between apertures 84 and 86. Aperture 94 which is considerably smaller than aperture 84 and 86, divides the central leg 90 into an input leg 95 and output leg 96. The dimension of aperture 94 along a line taken across the centers of the apertures is very small, so that legs 95 and 96 on either side of aperture 94 are of slightly less than unity cross-sectional area as indicated by the respective arrows 95*a* and 96*a*. Clearly, if the center leg 90 were of two units cross-sectional area, since the dimension of aperture 94, along the straight line, is very small, the cross-sectional area of each of legs 95 and 96** would be slightly less than one.

In the clear state, the directions of the flux lines through the various legs are as indicated by the arrows in FIGURE 5. Therefrom, it is seen that in the clear state, legs 88 and 90 are saturated, but the peripheral leg 92 is not, as indicated by arrows **92*a* and 92*b* pointing in opposite directions. However, such a leg ordinarily switches easier than its paired saturated leg 88. Therefore, during the clear odd pulse, supplied via winding 44, peripheral leg 92 and input leg 95 are set if, at the same time, a current via information loop 57 indicating a binary "1" is supplied. If however current is not induced in loop 57, no flux sets through the center leg 90, and therefore input leg 95** remains in its clear state, thus indicating a binary "0." The rest of the operation is similar to that described hereinbefore, and therefore will not be repeated.

There has accordingly been shown and described herein, novel structures of multiaperture cores which, together with related conventional single aperture cores, are operable in an information transferring arrangement, such as a shift register. Each multiaperture core comprises a plurality of legs including input and output legs, through which flux lines can be oriented in either of two directions. The single aperture core associated with each multiaperture core induces currents which overcome the threshold of the flux path around most of the periphery of the multiaperture core. Consequently, the current in the information loop coupling a receiving multiaperture core to the preceding multiaperture core need only overcome the threshold of the short center section of the multiaperture core. Therefore, lower currents can be used in the information coupling loops, resulting in less transfer losses. Also, the lower currents permit higher loop resistance, which in turn enables the use of smaller multiaperture cores. The smaller multiaperture cores enable the circuit to be operated with reduced driver power or higher efficiency.

What is claimed is:

1. A core of magnetic material having two states of magnetic remanence and being drivable therebetween, said core having first and second equally shaped major apertures at substantially opposite ends thereof, the core material extending between the periphery of said core and said first major aperture defining a first peripheral branch, and the core material extending between the periphery of said core at the opposite end from said first peripheral branch and said second major aperture defining, a second peripheral branch, said core having at least one minor aperture in a center core section defined by the material between said first and second major apertures, the core material between said minor aperture and said first and second major apertures defining at least input and output branches on either side of said minor aperture, the cross-sectional area of said center core section being at least equal to the cross-sectional area of either of said first peripheral branch or said second peripheral branch, said cross-section taken on a straight line substantially through the centers of said first and second major apertures and said minor aperture, the dimension of said at least one minor aperture along said straight line being less than the dimension of either of said first and second apertures along said line.

2. The improvements in a stage of a magnetic core shift register comprising a multiaperture core having two states of magnetic remanence and being drivable therebetween, said core having first and second major apertures at substantially opposite ends thereof, the core material extending between the periphery of said core and said first major aperture defining a first peripheral branch, and the core material extending between the periphery of said core at the opposite end from said first peripheral branch and said second major aperture defining a second peripheral branch, said core having at least one minor aperture in a center core section defined by the material between said first and second major apertures, the core material between said minor aperture and said first and second major apertures defining at least input and output branches on either side of said minor aperture, the cross-sectional area of said center core section being at least equal to the cross-sectional area of either of said first peripheral branch or said second peripheral branch, said cross-section taken on a straight line substantially through the centers of said first and second major apertures and said minor apertures; a single aperture core of magnetic material having said two states of magnetic remanence and being drivable therebetween; means for inductively coupling said first and second peripheral branches and said single aperture core; means for inductively coupling the center core section of said multiaperture core to the output branch of a preceding multiaperture core in said shift register; means for inductively coupling the output branch of said multiaperture core to the center core section of a succeeding multiaperture core in said shift register; first driving means wound about the single aperture core and at least one of the periphery branches of said multiaperture core for driving said cores to a first state of said two states of magnetic remanence; second driving means wound about the single aperture core for driving it to a second state of said two states of magnetic remanence; and prime driving means wound about the input and output branches of said multiaperture core for transferring the state of magnetic remanence of said input branch to said output branch.

3. A core of magnetic material having first and second major apertures at substantially opposite sides thereof, the material between the periphery of said core and said first major aperture defining a first peripheral branch of unit cross-sectional area, and the material between said first and second major apertures defining a center core section wherein an input aperture and an output aperture are disposed, each of the centers of said apertures being on a substantially straight line, the core material between said output aperture and said first major aperture defining an output branch, and the core material between said input and output apertures defining an input branch, each of said input and output branches having a unit cross-sectional area, the material between said input aperture and said second major aperture defining an additional branch of two units of cross-sectional area, the material in each of said branches having two states of magnetic remanence and being switchable therebetween, said cross-sections being taken on a straight line substantially through the centers of said first and second major apertures and said input and output apertures, the dimension of each of said input apertures and said output apertures along said line being not greater than the dimension of said major apertures along said line.

4. The improvements in a shift register wherein information is stored in a plurality of multiaperture magnetic cores and transferred from one multiaperture magnetic core to a succeeding core in response to driving pulses comprising a multiaperture core having first and second major apertures at substantially opposite sides thereof, the material between the periphery of said core and said first major aperture defining a first peripheral branch of unit cross-sectional area, and the material between said first and second major apertures defining a center core section wherein an input aperture and an output aperture are disposed, said input aperture or said output aperture being substantially smaller than either of said first or second major apertures, the centers of said apertures being on a substantially straight line, the core material between said output aperture and said first major aperture defining an output branch, and the core material between said input and output apertures defining an input branch, each of said input and output branches having a unit cross-sectional area, the material between said input aperture and said second major aperture defining an additional branch of two units of cross-sectional area, the material in each of said branches having two states of magnetic remanence and being switchable therebetween, said cross-sections being taken on a straight line substantially through the centers of said first and second major apertures and said input and output apertures; a single aperture core of magnetic material having said two states of magnetic remanence and being switchable therebetween; means for inductively coupling said first and second peripheral branches through said first and second major apertures and said single aperture core; means for inductively coupling the center core section of said multiaperture core to the output aperture of a preceding multiaperture core in said shift register; means for inductively coupling the output branch of said multiaperture core through the output aperture and said first major aperture thereof with the center core section of a succeeding multiaperture core; first driving means including means wound about the single aperture core and the first and second peripheral branches of said multiaperture core for driving said cores to a first state of said two states of magnetic remanence; second driving means including means wound about the single aperture core for driving it to a second state of said two states of magnetic remanence; and prime driving means wound about the input and output branches of said multiaperture core through the input and output apertures thereof, for switching the state of magnetic remanence of said input branch to said output branch.

5. A core of magnetic material having first and second equally shaped major apertures at substantially opposite sides thereof, the material between the periphery of said core and said first major aperture defining a first peripheral branch of unit cross-sectional area, and the material between said second major aperture and the periphery of said core defining a second peripheral branch of unit cross-sectional area, the core material between said first and second major apertures defining a center branch with a rectangularly shaped minor aperture centrally disposed therein, with the material of said center branch between said first major aperture and said minor aperture defining an input branch of one-half unit cross-sectional area, and the material of said center branch between said second major aperture and said minor aperture defining an output branch of one-half unit cross-sectional area, the magnetic material in each of said branches having two states of magnetic remanence and drivable therebetween, the cross-section of said branches taken along a straight line extending through the center of said first and second major apertures and the center of said minor aperture disposed therebetween, the dimensions of said minor aperture being substantially smaller than the dimension of either said first or said second major aperture, along said straight line.

6. A shift register having a plurality of intercoupled stages, comprising a plurality of multiaperture magnetic cores, each having a pair of major apertures disposed at opposite ends thereof and at least one minor aperture disposed between said pair of major apertures whereby the material between said apertures defines a plurality of core branches, including an input branch and an output branch, each branch having a clear and a set state of magnetic remanence and drivable therebetween; said plurality of multiaperture magnetic cores being arranged in a numbered sequence so as to form said plurality of stages; a plurality of single aperture magnetic cores each having a clear and a set state of magnetic remanence and drivable therebetween; means coupling a different one of said single aperture magnetic cores to another of said multiaperture magnetic cores; means for inductively coupling the output branch of a different one of said multiaperture magnetic cores to the input branch of the immediately succeeding multiaperture magnetic core; and means for driving each multiaperture magnetic core to its clear state, and the single aperture magnetic core coupled to the immediately succeeding multiaperture magnetic core to said set state to transfer information stored in the output branch of said each multiaperture magnetic core to the input branch of the immediately succeeding multiaperture magnetic core as a function or excitation induced in said means coupling said immediately succeeding multiaperture magnetic core to said single aperture magnetic core and in said means coupling the input branch thereof to the output branch of the multiaperture magnetic core preceding it in said sequence.

7. A shift register as recited in claim 6 wherein said means for driving each multiaperture core comprises first winding means inductively coupling the odd numbered multiaperture magnetic cores in said numbered sequence and the single aperture magnetic cores coupled to the even numbered multiaperture magnetic cores in said numbered sequence; second winding means inductively coupling the even numbered multiaperture magnetic cores and the single aperture magnetic cores coupled to the odd numbered multiaperture magnetic cores in said numbered sequence; means for exciting said first winding means to drive said odd numbered multiaperture magnetic cores to their clear state of magnetic remanence and to drive the single aperture magnetic cores inductively coupled by said first winding means to their set state of magnetic remanence so as to transfer information from the output branch of a different one of the multiaperture magnetic cores bearing odd numbers to the input branch of the multiaperture magnetic cores bearing an even number as a function of the excitation induced in said means coupling a different one of said single aperture magnetic cores coupling said even numbered multiaperture magnetic cores to said single aperture magnetic cores and in said means for inductively coupling the output branch of a different one of said multiaperture magnetic cores bearing odd numbers to the input branch of the immediately succeeding multiaperture magnetic core; means for energizing said first winding means to drive said even numbered multiaperture magnetic cores to their clear state of magnetic remanence, and to drive the single aperture magnetic cores inductively coupled by said first winding means to their set state of magnetic remanence so as to transfer information from the output branch of a different one of the multiaperture magnetic cores bearing even numbers to the input branch of the multiaperture magnetic cores bearing an odd number as a function of the excitation induced in said means coupling a different one of said single aperture magnetic cores coupling said odd numbered multiaperture magnetic cores to said single aperture magnetic cores and in said means for inductively coupling the output branch of a different one of said multiaperture magnetic cores bearing even members to the input branch of the immediately succeeding multiaperture magnetic core; and means inductively coupled to the input and output branches of each of said multiaperture magnetic cores for transferring information stored in the input branches of said multiaperture magnetic cores to their respective output branches.

8. A shift register as recited in claim 7 wherein each of said multiaperture magnetic cores comprises a substantially rectangular magnetic core with said pair of major apertures disposed at substantially opposite ends of said rectangular core and input and output minor apertures disposed therebetween the amount of magnetic material extending uninterruptedly between a major aperture and an edge of said cross-section defining a peripheral branch, with the amount of magnetic material extending uninterruptedly between said input and output apertures, and said output aperture and one of said pair of major apertures defining said input and output branches respectively, the cross-section of said peripheral branches and said input and output branches, taken on a straight line extending substantially through the centers of said pair of major apertures and said input and output apertures being substantially equal to one another.

9. A shift register as recited in claim 7 wherein each of said multiaperture magnetic cores comprises a pair of major apertures disposed at substantially, opposite ends of said magnetic core and a single aperture disposed therebetween, the amount of magnetic material extending uninterruptedly between a major aperture and an edge of said core defining a peripheral branch, and the amount of magnetic material extending uninterruptedly between said single minor aperture and said pair of major apertures defining input and output branches respectively; each of said peripheral branches having a cross-sectional area equal to at least twice the cross-sectional area of either said input or output branches, said cross-section being taken on a straight line extending substantially through the centers of said pair of major apertures and said single minor aperture.

10. An improved shift register comprising a plurality of multiaperture magnetic cores arranged in a sequence and being successively designated as odd and even cores in said sequence, each of said cores having a plurality of apertures defining a plurality of branches including input and output branches, each branch having a clear and a set state of magnetic remanence and being drivable therebetween; a plurality of closed information windings, a different one of which inductively couples the output branch of one multiaperture magnetic core with the input branch of the immediately following multiaperture core in said sequence; a plurality of single aperture magnetic cores each having a clear and a set state of magnetic remanence and being drivable therebetween; a plurality of closed-loop flux supply windings, a different one of which inductively couples a different one of said multiaperture magnetic cores; first means for driving the odd cores in said sequence to the clear state and the single aperture cores coupled to the even cores in said sequence to their set state so as to transfer information stored in the output branch of each odd multiaperature core to the input branch of the immediately succeeding even multiaperture core in said sequence as a function of excitations inducted in the closed information winding coupling the respective odd core to the immediately succeeding even core, and in the closed-loop flux supply winding coupling said immediately succeeding even core with the single aperture core coupled thereto; second means for driving the even cores in said sequence to the clear state and the single aperture cores coupled to the odd cores to their set state so as to transfer information stored in the output branch of each even core to the input branch of the immediately succeeding odd core in said sequence as a function of excitations induced in the closed-loop information winding coupling the respective even core to the immediately succeeding odd core and in the closed-loop flux supply winding coupling said immediately succeeding odd core with the single aperture core coupled thereto; and means for transferring the information stored in the input branch of each of said multiaperture magnetic cores to the output branch of the respective multiaperture magnetic core.

11. An improved shift register comprising a plurality of multiaperture magnetic cores arranged in a sequence and being successively designated as odd and even cores in said sequence, each of said cores having a plurality of apertures defining a plurality of branches including input and output branches, each branch having a clear and a set state of magnetic remanence and being drivable therebetween; a plurality of closed information windings, a different one of which inductively couples the output branch of one multiaperture magnetic core with the input branch of the immediately following multiaperture magnetic core in said sequence; a plurality of single aperture magnetic cores each having a clear and a set state of magnetic remanence and being drivable therebetween; a plurality of closed-loop flux supply windings, a different one of which inductively couples a different one of said single aperture magnetic cores to another of said multiaperture magnetic cores; first means for driving the odd cores in said sequence to their clear state of magnetic remanence and the single aperture magnetic cores coupled to the even cores in said sequence to their set state, including an odd clear winding inductively coupled to all the odd cores in said sequence and to the single aperture magnetic cores coupled to said even cores; second means for driving the even cores in said sequence to their clear state of magnetic remanence and the single aperture magnetic cores coupled to the odd cores in said sequence to their set state, including an even clear winding inductively coupled to all the even cores in said sequence and to the single aperture magnetic cores coupled to said odd cores in said sequence; and third means for controlling the state of magnetic remanence of the output branch of each of said multiaperture magnetic cores in said sequence as a function of the state of magnetic remanence of the input branch of the respective multiaperture magnetic core in said sequence.

12. An information storage register comprising a plurality of multiaperture magnetic cores each of which has an input aperture, an output aperture and a pair of main apertures, said apertures defining a plurality of core branches therein including an input branch and output branch and a pair of peripheral branches, each core brance having discrete clear and set states of magnetic remanence said plurality of cores being arranged in a numbered sequence; a plurality of first information transfer windings each of which couples the output aperture of a different one of the multiaperture magnetic cores bearing odd numbers to the pair of main apertures of a succeeding one of the multiaperture magnetic cores bearing even numbers; a plurality of second information transfer windings each of which couples the output aperture of a different one of the multiaperture magnetic cores bearing even numbers to the pair of main apertures of a succeeding one of the multiaperture magnetic cores bearing odd numbers; a plurality of single aperture magnetic cores, each having clear and set states of magnetic remanence; a plurality of flux windings each of which couples the aperture of a different one of said single aperture cores to the pair of main apertures of a different one of said multiaperture magnetic cores; first winding means wound about the pair of peripheral branches of each of said odd numbered multiaperture magnetic cores, through the input apertures of said odd numbered multiaperture magnetic cores and through the apertures of the single apertured cores coupled to said even numbered multiaperture magnetic cores; second winding means wound about the pair of peripheral branches of each of said even numbered multiaperture magnetic cores, through the input apertures of said even numbered multiaperture magnetic cores and through the apertures of the single apertured cores coupled to said even numbered multiaperture magnetic cores; means for exciting said first winding means to control all the branches of each of said odd numbered multiaperture magnetic cores to be in their discrete clear state of magnetic remanence and the single aperture magnetic cores coupled to said even numbered multiaperture magnetic cores to be in their discrete set state of magnetic remanence so as to transfer information from the output branches of the multiaperture magnetic cores bearing odd numbers to the input branches of the succeeding multiaperture magnetic cores bearing even numbers, as a function of the excitation induced in the plurality of first information transfer windings and the flux windings coupling said even numbered multiaperture magnetic cores to their respective single aperture magnetic cores; means for exciting said second winding means to control all the branches of each of said odd numbered multiaperture magnetic cores to be in their discrete clear state of magnetic remanence and the single aperture magnetic cores coupled to said even numbered multiaperture magnetic cores to be in their discrete set state of magnetic remanence so as to transfer information from the output branch of a different one of the multiaperture magnetic cores bearing even numbers to the input branch of the succeeding one of the multiaperture magnetic cores bearing odd numbers as a function of the excitation induced in the plurality of said second information transfer windings and the flux windings coupling said odd numbered multiaperture magnetic cores to their respective single aperture magnetic cores; prime winding means coupled to the input and output apertures of each of said multiaperture magnetic cores; and means for exciting said prime winding means to transfer information stored in the input branches of said multiaperture magnetic cores to their respective output branches, and to drive said input branches to their clear states.

References Cited

UNITED STATES PATENTS

| | | | |
|---|---|---|---|
| 3,106,702 | 10/1963 | Haynes et al. | 340—174 |
| 3,059,224 | 10/1962 | Post | 340—174 |
| 2,869,112 | 1/1959 | Hunter | 340—174 |

JAMES W. MOFFITT, *Primary Examiner.*